United States Patent [19]
Howse et al.

[11] Patent Number: 5,759,613
[45] Date of Patent: Jun. 2, 1998

[54] COMBATTING OF UNAUTHORIZED TAMPERING WITH IDENTIFICATION MARKS

[75] Inventors: Hugo Jean Howse; Heidi Lynette De Villiers-Filmer; Neville Raymond Comins, all of Pretoria, South Africa

[73] Assignee: CSIR, Pretoria, South Africa

[21] Appl. No.: 811,514

[22] Filed: Mar. 4, 1997

[30] Foreign Application Priority Data

Mar. 5, 1996 [ZA] South Africa .................. 96/1796

[51] Int. Cl.$^6$ ............................................ B05D 5/00
[52] U.S. Cl. .................. 427/7; 427/447; 427/448; 427/453; 427/454; 427/455
[58] Field of Search ........................ 427/447, 448, 427/453, 7, 454, 455

[56] References Cited

U.S. PATENT DOCUMENTS

| | | | |
|---|---|---|---|
| 3,548,237 | 12/1970 | Schreurs | 313/109 |
| 4,031,268 | 6/1977 | Fairbairn | 427/448 |
| 4,327,120 | 4/1982 | Siemers et al. | 427/453 |
| 4,327,155 | 4/1982 | Hanneman | 428/556 |
| 4,883,720 | 11/1989 | Stangl | 427/199 |

OTHER PUBLICATIONS

Chemical Abstracts 74:47201—Abstract of U.S. Patent No. 3,548,237, supra (no date).
Chemical Abstracts 96:77554—Abstract of British Patent Specification No. 2,075,207A dated Nov. 11, 1981.
Chemical Abstracts 97:114054—Abstract of U.S. Patent No. 4,327,155, supra (no date).
Chemical Abstracts 104:73657—Abstract of Japanese Patent Publication No. 60131847A2 dated Jul. 13, 1985.
Chemical Abstracts 107:9049—Abstract of Japanese Patent Publication No. 61-247772A2 dated Nov. 5, 1986.
Chemical Abstracts 107:41891—Abstract of Japanese Patent Publication No. 61-278576A2 dated Dec. 9, 1986.
Chemical Abstracts 107:87335—Abstract of European Patent Application No. 202902A1 dated Nov. 26, 1986.
Chemical Abstracts 115:258,432—Abstract of Japanese Patent Publication No. 03-180606A2 dated Aug. 6, 1991.
Chemical Abstracts 117:103046—Abstract of Journal of Chromatography, 1992, vol. 603 (1–2), pp. 223–9 (no month date).
Conference Paper Abstract—Abstract of Takeda et al., "Recent Advancement in Thermal Barrier Coatings", Advanced Composite Materials II (Conference) in Tsukuba, Japan 1990 (no month date).

*Primary Examiner*—Katherine A. Bareford
*Attorney, Agent, or Firm*—Rockey, Milnamow & Katz, Ltd.

[57] ABSTRACT

The invention provides a method of treating an artifact to combat unauthorized tampering with the identity thereof. The method comprises forming a coating on at least part of a surface of the artifact, to provide the artifact with an identification mark which comprises said coating. Forming the coating is by means of thermal spray-coating. The method can be used to coat a pre-formed identification mark on the surface, or to apply an identification mark to the surface, the mark being an engine number, chassis number, or the like. The method acts to render vehicle or aircraft theft, and forgery of parts thereof, more difficult.

9 Claims, No Drawings

COMBATTING OF UNAUTHORIZED TAMPERING WITH IDENTIFICATION MARKS

This invention relates to the combatting of forgery or theft of artifacts arising from unauthorized tampering with the identity thereof. More particularly, the invention relates to a method of treating an artifact to combat forgery or theft thereof arising from unauthorized tampering with the identity thereof, suitable for, but not limited to, combatting the forgery of artifact identification numbers; and the invention relates also to an artifact which has been treated in accordance with the method. Artifacts treated in accordance with the invention can include, but are not restricted to, devices, articles, machines, engines, identification plates or components thereof, and the invention is expected to have particular utility in the context of combatting the theft of vehicles and aircraft, and the forgery of parts thereof, such as engines or chassis thereof.

According to the invention there is provided a method of treating an artifact to combat unauthorized tampering with the identity thereof, which method comprises forming a coating on at least part of a surface of the artifact, to provide the artifact with an identification mark which comprises said coating, forming the coating being by means of thermal spray-coating.

The spray-coating may include forming a coating on at least part of, or conveniently on all of, a pre-formed identification mark, which coating acts to render the identification mark resistant to tampering or alteration. Thus, in one embodiment, said surface may have a pre-formed identification mark thereon, the method comprising forming the coating so that it covers and encloses at least part of the pre-formed mark, and in this case the method may comprise selecting the thickness and transparency of the coating formed, to ensure that the pre-formed identification mark remains identifiable after the coating has been formed, the identification function of the identification mark being essentially unaffected by the forming of the coating, forming the coating preferably being with a thickness thereof of 0.1–2.5 mm.

The pre-formed identification mark may be in the form of lettering, numerals, symbols, one or more logos, or the like, or combinations thereof. The mark will often be recessed, e.g. by being imprinted, cut or stamped, in or on a surface of the artifact. Naturally, the mark can also protrude from or stand proud of the surface of the artifact, e.g. being formed by embossing or moulding. The mark may often be a serial number or logo stamped into or on to the artifact.

The artifact may in particular form part of an aircraft or motor vehicle, being e.g. an engine or chassis of the aircraft or vehicle. The identification mark may thus be a aircraft or vehicle identity number (VIN) provided on the engine or chassis of the aircraft or vehicle during manufacture of the vehicle.

Typically, the coating may, as indicated above, have a thickness of 0.1–2.5 mm, preferably 0.2–0.5 mm, e.g. 0.25 mm, and the thickness and/or transparency of the coating will be selected so that the identification mark remains clearly visible or otherwise identifiable after the coating.

Instead of forming the coating on an artifact which has a pre-formed identification mark thereon, said surface may be free of any pre-formed identification mark, the method comprising forming the identification mark on the surface by forming the coating on the surface. In other words, forming the coating may act to form the identification mark on the surface.

The spray-coating may thus be through a template located between the surface and a spray source.

The spray-coating will, as indicated above, be by means of a thermal spraying technique. The thermal spraying technique may be used to apply at least one of a metal coating, an alloy coating, a ceramic coating, a composite metal-ceramic coating or a polymeric coating to the surface. The coating may thus be a coating selected from the group consisting of a metal, e.g. aluminium, a metal alloy, e.g. stainless steel, a ceramic, e.g. alumina, a ceramic metal composite, e.g. a cermet such as tungsten carbide-cobalt, and a polymeric material, e.g. nylon. In other words, the spray coating may be by thermal spraying of a coating material selected from the group consisting of metals, alloys, ceramics, cermets, polymers and mixtures thereof.

Thermal spraying techniques which may be used include wire- or powder flame spraying, electric arc wire spraying, plasma arc spraying and high-velocity oxy-fuel combustion (HVOF) spraying. In other words, material making up the coating may be heated in wire, cored wire, strip or powder form, the heating optionally being by means of an oxyfuel e.g. an acetylene, hydrogen, kerosene, paraffin, the gas available under the Trade Mark MAPP from Dow Chemical Corporation, propylene or propane flame, or an electric arc or a plasma arc. The heated coating material may be propelled or sprayed on to the surface of the artifact by means of the spray source using, as mentioned above, a high velocity gas stream, the gas stream comprising a selected gas or gases, which may be the combustion gases, or which may be inert, such as nitrogen or argon, when electric arc wire spraying or plasma arc spraying is used. When the heated coating material is spray-coated on to the surface, it impacts on the surface of the identification mark where it rapidly solidifies and adheres to the surface to form the coating. The heated coating material typically bonds to the surface by forming mechanical and/or metallurgical bonds with the surface. The spraying may, as indicated above, be of more or less pure metal or alloy obtained e.g. from a consumable wire or powder source or may be of a cermet or ceramic, obtained e.g. from a consumable powder or cored wire source. In particular, the thermal spraying may be by a technique selected from wire flame spraying, powder flame spraying, electric arc wire spraying, plasma arc spraying and high-velocity oxy-fuel combustion spraying.

The coating may have a hardness value of at least 700 Vickers hardness, to discourage easy removal thereof; and the coating may be heat resistant, being capable of withstanding temperatures of up to 2500° C. Preferably, the spraying technique and coating material used may be selected, in combination, to provide the surface with a coating which has a Vickers hardness of at least 700 and which is capable of withstanding a temperature of 2500° C.

Optionally, the coating may comprise one or more identification constituents, such as fluorescent agents or identification agents, for emphasizing unauthorised tampering, forging or alteration of any identification mark on the artifact. When the identification mark is altered or tampered with, the integrity of the coating will partially or totally be destroyed, thus causing partial or total removal of, for example, the fluorescent agent in the coating. This can readily be ascertained by shining an ultraviolet light on the coating, thereby revealing whether or not the coating has been altered or tampered with. Alternatively or together with the fluorescent agent, the coating may have one or more other constituents which form identification agents, such as specific metals or particular ratios of metals or other constituents, provided therein to provide the coating with a composition which acts as a particular signature, to indicate, e.g. by means of chemical analysis, forging by unauthorised tampering or alteration of an identification mark. Accordingly, a sample of the coating can, if desired, be removed and chemically analysed to determine whether or not the identification mark has been tampered with or altered in any way. In particular, the coating may be formed so as to fluoresce in a particular manner when subjected to certain selected wavelengths ultraviolet light, which fluorescence acts as a signature to confirm authenticity of the artifact. In general, thus, forming the coating may be by means of a coating material which comprises one or more identification constituents which provide it with a quality which combats forging; and forming the coating may be by means of a coating material which comprises an identification constituent which fluoresces when ultra-violet light is shone thereon.

The method will usually include, prior to forming the coating, the step of pretreating the surface to be coated by cleaning and roughening it , to promote good adhesion between said surface and the coating, e.g. by grit-blasting, water-blasting or sand-papering of the surface. Optionally, prior to the spray-coating, a bonding coat may be applied to the artifact surface to improve adhesion between the identification mark and the coating. The bonding coat may be selected from materials which bond to the surface of the device or machine as a result of an exothermic reaction, such as nickel-aluminium alloys, and/or from materials that melt at elevated temperatures, such as molybdenum. In other words, forming the coating may be to provide a bonding layer on the surface to be coated, and to provide an outer layer on the bonding layer.

The invention extends to an artifact, in particular an artifact or motor vehicle engine or chassis, whenever treated in accordance with the method described above.

The invention will now be described by way of non-limiting illustration, with reference to the following Example.

EXAMPLE

A surface of an artifact in the form of an engine block carrying a vehicle identification number (VIN) stamped therein was pretreated by grit-blasting with alumina grit having a particle size of No. 24 ASTM mesh size for a period of 30 seconds. An air pressure of 60 kPa through a nozzle of 10 mm inside diameter was used during the grit-blasting, and the grit-blasting formed a roughened surface on the vehicle identification number to improve coating adhesion. The vehicle identification number was then framed using a heat-resistant blue silicone masking tape available from Dewal Industries Inc. USA, obtained from Weartech, Johannesburg, South Africa. The vehicle identification number was then coated using a mixture of $Al_2O_3$ (97% by mass) $TiO_2$ (3%) ceramic powder (20–45 µm) and Praxair YO-103 thermal spray powder (yttrium oxide powder comprising 6.5% by mass europium oxide). The coating was sprayed on the masked area carrying the VIN, using a METCO 9MC plasma system, a 9MB plasma gun and a 9MP powder feeder (available in South Africa from Tribo-Corr (Proprietary) Limited), and in the United States from Sulzer Metco Inc., New York. The parameters employed to produce the coating on the vehicle identification number are set out below:

| SPRAYING PARAMETERS | |
| --- | --- |
| Nitrogen flow | 80 Standard Cubic Feet/hour |
| Hydrogen flow | 15 Standard Cubic Feet/hour |
| Current | 500A |
| Voltage | 74V |
| Stand-off distance | 65 mm |
| Powder Feed Rate | 45 g/min |

The vehicle identification number could clearly be read after the coating had been applied thereto. When the coating was illuminated with a fluorescent light, the coating fluoresced.

The VIN was then removed from the surface by grinding the area of the surface carrying the VIN, which resulted in the coating covering the VIN also being removed therefrom. When the ground area was subsequently illuminated with a fluorescent light, no fluorescence was visible, thereby immediately indicating that the VIN had been tampered with. The coating was selected so that it was extremely difficult or impossible to replicate or forge the coated VIN number, as knowledge of the formulation of the coating and the powders from which it was sprayed, and how it was applied, would be required.

It is an advantage of the invention, with particular reference to the Example, that it can provide a method of rendering identification marks resistant to tampering, forging or alteration. The invention is particularly suitable for combatting the forging of or unauthorized tampering with aircraft or vehicle engine and chassis numbers, or other such numbers, e.g. on firearms or machinery or engine components, or identification plates. The identification mark is, first, rendered relatively resistant to removal by mechanical means, e.g. grinding or filing, by chemical means, or by heating. Secondly, tampering or alteration, of the identification mark can be discouraged, by providing the identification mark with constituents, which allow ascertainment of whether or not the identification mark has been tampered with or altered, e.g. fluorescent constituents, or by providing the identification mark with identification constituent(s) to allow identification thereof when chemically analysed or viewed under particular ultraviolet light wavelengths. The identification mark coated in accordance with the invention can thus tend to discourage tampering or unauthorized alteration thereof because of hardness and wear resistance or other physical properties of the coating which make the identification mark resistant to tampering or alteration. Accordingly, coatings applied in accordance with the method of the invention are resistant to removal by mechanical means, such as filing or grinding, and unauthorised tampering or altering of the identification mark can be rendered unattractive, by providing the identification mark with constituents which indicate unauthorised altering or tampering with the identification mark. In addition, the replication of the coating is only possible if one is in possession of a suitable thermal spray system as well as the correct consumable or raw materials, e.g. powders. Hence strict control of the availability of raw materials will tend to discourage tampering with the identification mark, since it is difficult to provide false or forged numbers having a substantially similar or identical coating.

We claim:

1. A method of treating an artifact to combat unauthorized tampering with the identity thereof, the artifact having a surface with a pre-formed identfication mark thereon, which method comprises forming a coating on at least part of the surface of the artifact, by thermal spray-coating, so that the coating covers and encloses at least part of the pre-formed mark.

2. A method as claimed in claim 1, which comprises forming the coating with a selected thickness and with a selected transparency, to ensure that the pre-formed identification mark remains identifiable after the coating has been formed, the identification function of the identification mark being essentially unaffected by the forming of the coating.

3. A method as claimed in claim 2, in which forming the coating is with a thickness thereof of 0.1–2.5 mm.

4. A method as claimed in claim 1, in which the spray-coating is through a template located between the surface and a spray source.

5. A method as claimed in claim 1, in which the spray-coating is by thermal spraying of a coating material selected from the group consisting of metals, alloys, ceramics, cermets, polymers and mixtures thereof.

6. A method as claimed in claim 1, in which the thermal spraying is by a technique selected from wire flame spraying, powder flame spraying, electric arc spraying, plasma arc spraying and high-velocity oxy-fuel combustion spraying.

7. A method as claimed in claim 1, in which the thermal spray-coating is performed in a selected manner, with a selected coating material, to provide the surface with a coating which has a Vickers hardness of at least 700 and which is capable of withstanding a temperature of 2500° C.

8. A method as claimed in claim 1, in which forming the coating is by means of a coating material which comprises an identification constituent which fluoresces when ultraviolet light is shone thereon.

9. A method as claimed in claim 1, in which forming the coating is to provide a bonding layer on the surface to be coated, and to provide an outer layer on the bonding layer.

* * * * *